(12) United States Patent
Grossman

(10) Patent No.: US 8,487,018 B2
(45) Date of Patent: Jul. 16, 2013

(54) HEAVY METAL-FREE AND ANAEROBICALLY COMPOSTABLE VINYL HALIDE COMPOSITIONS, ARTICLES AND LANDFILL BIODEGRADATION

(75) Inventor: Richard F. Grossman, Wilmington, DE (US)

(73) Assignee: Biotech Products, LLC, Randolph, NJ (US)

(*) Notice: Subject to any disclaimer, the term of this patent is extended or adjusted under 35 U.S.C. 154(b) by 289 days.

(21) Appl. No.: 13/031,322

(22) Filed: Feb. 21, 2011

(65) Prior Publication Data

US 2011/0159766 A1  Jun. 30, 2011

Related U.S. Application Data

(63) Continuation-in-part of application No. 12/500,805, filed on Jul. 10, 2009, now Pat. No. 7,956,101, which is a continuation-in-part of application No. 11/747,481, filed on May 11, 2007, now Pat. No. 7,902,271, which is a continuation-in-part of application No. 11/041,322, filed on Jan. 24, 2005, now Pat. No. 7,390,841, said application No. 12/500,805 is a continuation-in-part of application No. 12/049,668, filed on Mar. 17, 2008, now Pat. No. 7,939,582, and a continuation-in-part of application No. 12/098,613, filed on Apr. 7, 2008, now abandoned.

(51) Int. Cl.
| | |
|---|---|
| A61L 2/08 | (2006.01) |
| B01F 17/00 | (2006.01) |
| B09B 5/00 | (2006.01) |
| B32B 3/00 | (2006.01) |
| B32B 3/10 | (2006.01) |
| B32B 5/00 | (2006.01) |
| B32B 7/00 | (2006.01) |
| B32B 7/12 | (2006.01) |
| B32B 9/04 | (2006.01) |
| B32B 27/02 | (2006.01) |
| B32B 27/30 | (2006.01) |
| B44D 3/18 | (2006.01) |
| C07D 209/48 | (2006.01) |
| C08C 19/00 | (2006.01) |
| C08C 19/20 | (2006.01) |
| C08C 19/22 | (2006.01) |
| C08F 8/00 | (2006.01) |
| C08F 8/30 | (2006.01) |
| C08F 8/32 | (2006.01) |
| C08F 8/34 | (2006.01) |
| C08F 8/44 | (2006.01) |
| C08F 14/00 | (2006.01) |
| C08F 14/06 | (2006.01) |
| C08F 14/08 | (2006.01) |
| C08F 14/16 | (2006.01) |
| C08F 14/02 | (2006.01) |
| C08F 14/18 | (2006.01) |
| C08F 32/00 | (2006.01) |
| C08F 114/02 | (2006.01) |
| C08F 114/06 | (2006.01) |
| C08F 114/08 | (2006.01) |
| C08F 114/16 | (2006.01) |
| C08F 36/00 | (2006.01) |
| C08F 114/18 | (2006.01) |
| C08F 132/00 | (2006.01) |
| C08F 136/00 | (2006.01) |
| C08F 214/00 | (2006.01) |
| C08F 214/02 | (2006.01) |
| C08F 214/06 | (2006.01) |
| C08F 214/08 | (2006.01) |
| C08F 214/16 | (2006.01) |
| C08F 214/18 | (2006.01) |
| C08F 232/00 | (2006.01) |
| C08F 236/00 | (2006.01) |
| C08G 18/80 | (2006.01) |
| C08G 63/48 | (2006.01) |
| C08G 63/91 | (2006.01) |
| C08G 73/10 | (2006.01) |
| C08K 5/00 | (2006.01) |
| C08K 5/16 | (2006.01) |
| C08K 5/23 | (2006.01) |
| C08K 5/34 | (2006.01) |
| C08K 5/35 | (2006.01) |
| C08K 5/36 | (2006.01) |
| C08K 5/48 | (2006.01) |
| C08K 5/3435 | (2006.01) |
| C08K 5/3437 | (2006.01) |
| C08K 5/3492 | (2006.01) |
| C08L 27/00 | (2006.01) |
| C09B 67/00 | (2006.01) |
| C10L 1/14 | (2006.01) |
| D06N 7/00 | (2006.01) |
| D06N 7/04 | (2006.01) |
| D06P 1/52 | (2006.01) |

(52) U.S. Cl.
USPC ........ 523/124; 405/129.95; 428/98; 428/137; 428/147; 428/190; 442/155; 442/164; 524/86; 524/94; 524/95; 524/96; 524/99; 524/100; 524/101; 524/186; 524/190; 524/211; 524/212; 524/392; 524/567; 524/568; 524/569; 525/55; 525/326.1; 525/326.2; 525/330.7; 525/331.3; 525/331.4; 525/331.5; 525/343; 525/350; 525/370; 525/374; 525/375

(58) Field of Classification Search
USPC .................. 523/124; 524/86, 94, 95, 96, 99, 524/100, 101, 186, 190, 211, 212, 392, 567, 524/568, 569; 525/55, 326.1, 326.2, 330.7, 525/331.3, 331.4, 331.5, 343, 350, 370, 374, 525/375; 428/98, 137, 147, 190; 405/129.95; 442/155, 164
See application file for complete search history.

(56) References Cited

U.S. PATENT DOCUMENTS

| | | | |
|---|---|---|---|
| 2,641,588 A | 6/1953 | Leistner et al. | |
| 2,641,596 A | 6/1953 | Leistner et al. | |
| 2,648,650 A | 8/1953 | Weinberg et al. | |
| 2,726,227 A | 12/1955 | Leistner et al. | |

| | | |
|---|---|---|
| 2,726,254 A | 12/1955 | Leistner et al. |
| 2,801,258 A | 7/1957 | Johnson |
| 2,870,119 A | 1/1959 | Leistner et al. |
| 2,870,182 A | 1/1959 | Leistner et al. |
| 2,872,468 A | 2/1959 | Leistner et al. |
| 2,883,363 A | 4/1959 | Leistner et al. |
| 2,891,922 A | 6/1959 | Johnson |
| 2,914,506 A | 11/1959 | Mack et al. |
| 2,954,363 A | 9/1960 | Kuehne et al. |
| 3,021,302 A | 2/1962 | Frey et al. |
| 3,413,264 A | 11/1968 | Hechenbleikner et al. |
| 3,424,712 A | 1/1969 | Gottlieb et al. |
| 3,424,717 A | 1/1969 | Gottlieb et al. |
| 4,069,192 A | 1/1978 | Monte et al. |
| 4,080,353 A | 3/1978 | Monte et al. |
| 4,087,402 A | 5/1978 | Monte et al. |
| 4,094,853 A | 6/1978 | Monte et al. |
| 4,096,110 A | 6/1978 | Monte et al. |
| 4,098,758 A | 7/1978 | Monte et al. |
| 4,101,810 A | 7/1978 | Schermerhorn et al. |
| 4,122,062 A | 10/1978 | Monte et al. |
| 4,152,311 A | 5/1979 | Monte et al. |
| 4,192,792 A | 3/1980 | Sugerman et al. |
| 4,261,913 A | 4/1981 | Monte et al. |
| 4,277,415 A | 7/1981 | Sugerman et al. |
| 4,338,220 A | 7/1982 | Sugerman et al. |
| 4,417,009 A | 11/1983 | Sugerman et al. |
| 5,108,807 A | 4/1992 | Tucker |
| 5,514,734 A | 5/1996 | Maxfield et al. |
| 7,390,841 B2 | 6/2008 | Grossman |
| 2003/0196960 A1 | 10/2003 | Hughes |

FOREIGN PATENT DOCUMENTS

| | | |
|---|---|---|
| DE | 10157420 A1 | 6/2003 |
| EP | 1127914 A2 | 8/2001 |
| GB | 1423657 A | 2/1976 |
| GB | 1488620 A | 10/1977 |
| WO | 9923118 A1 | 5/1999 |
| WO | 0017270 | 3/2000 |
| WO | 0017270 A1 | 3/2000 |
| WO | 0174555 A1 | 10/2001 |
| WO | 02070104 | 9/2002 |
| WO | 2004032988 A2 | 4/2004 |
| WO | 2007095707 A1 | 8/2007 |

OTHER PUBLICATIONS

Database WPI Week 200375 Thomson Scientific, London, GB; AN 2003-792851 XP002505739 & JP 2003 105182 A (New Japan Chem. Co. Ltd.) Apr. 9, 2003 abstract.

T. M. Phillips et al., Biodegradation of Hexachlorocyclohexane (HCH) by Microorganisms, Biodegradation 16: 363-392 (2005).

Y. Otake et al., Biodegradation of Low-Density Polyethylene, Polyvinyl Chloride, and Urea Formaldehyde Resin Buried Under Soil for Over 32 Years. J. Applied Polymer Science, vol. 56, 1789-1796 (1995).

I. Mersiowsky, Fate of PVC Polymer, Plasticizers, and Stabilizers in Landfilled Waste, J. Vinyl & Additive Technology, vol. 8, No. 1, Mar. 2002.

Leonard I. Nass and Charles A. Heiberger, Encyclopedia of PVC, vol. 2, p. 47, Marcel Dekker, Inc., New York., Sep. 28, 1987.

Ha, K R et al, "Polycarpolactone Polyvinyl Chloride Polymer Mixture Biodegradable Film Sheet", Abstract Only, Database WPI Section Ch. Week 200348 Derwent Publications Ltd., London, GB; AN2003-511077XP002353301 and KR 2003 019 726 A (HA K R) Mar. 7, 2003.

Organometallic Coupling Agents, Capatue Chemical, published on website http://www.capatue.com, 7 pages, no publication date.

A.V. Yabannavar et al., Methods for Assessment of Biodegradability of Plastic Films in Soil, Applied and Environmental Microbiology, vol. 60, No. 9, Oct. 1994, pp. 3608-3614.

*Primary Examiner* — Patrick Niland

(74) *Attorney, Agent, or Firm* — Wood, Herron & Evans, LLP

(57) ABSTRACT

Heavy metal-free compostable polymers, composites and articles anaerobically biodegrade in landfills in a relatively short time. Heavy metal-free composite polymeric articles and sheets such as indoor or outdoor signs, billboards, banners, images, protective barriers, backdrops and wall coverings have very useful service durations and yet are landfill biodegradable.

38 Claims, No Drawings

HEAVY METAL-FREE AND ANAEROBICALLY COMPOSTABLE VINYL HALIDE COMPOSITIONS, ARTICLES AND LANDFILL BIODEGRADATION

RELATED APPLICATION

This application is a continuation-in-part application of U.S. patent application Ser. No. 12/500,805, filed Jul. 10, 2009, which in turn is a continuation-in-part of U.S. patent application Ser. No. 11/747,481, filed May 11, 2007, which in turn is a continuation-in-part of U.S. patent application Ser. No. 11/041,322, filed Jan. 24, 2005, now U.S. Pat. No. 7,390,841, U.S. patent application Ser. No. 12/049,668, filed Mar. 17, 2008 and U.S. patent application Ser. No. 12/098,613 filed Apr. 7, 2008, and the entire description and claims of these applications are incorporated herein by reference.

FIELD OF THE INVENTION

This invention relates to heavy metal-free and anaerobically compostable polymeric compositions and articles having indoor and outdoor utilities with effective anaerobic landfill degradation. Articles of the polymer compositions are also made into composites having an hydrophobic polymer surface layer and an underlying hydrolyzable biodegradable polymer layer which biodegrade in landfills in a relatively short time.

BACKGROUND OF THE INVENTION

For many years it has been desired to make plastic materials from polymers such as polyvinyl chloride (PVC), polyvinyl acetate (PVAc), and olefin polymers (EPDM) which are either biodegradable by microorganisms or environmentally degradable such as in a landfill. In spite of considerable efforts, landfills are becoming inundated with plastic materials, and articles made therefrom, that will not degrade perhaps for centuries. This is especially true for vinyl halide and olefin polymer materials such as PVC and EPDM that are considered non-biodegradable, that is, they persist in landfills under anaerobic conditions indefinitely without noticeable decomposition. This factor limits the acceptance of PVC and polyolefins in many products where their useful balance of properties and low cost would be attractive. An example is that of printable film and sheet. If a sample of EPDM or flexible (plasticized) PVC is tested per ASTM D 5526, Standard Test Method for Determining Anaerobic Biodegradation of Plastic Materials Under Accelerated Landfill Conditions, there is no appreciable weight loss or change in appearance after 100 days at 97° F. in contact with simulated household waste. In contrast, cellulosic polymers and other biodegradable plastics, such as polylactic acid and polycaprolactone, are completely consumed.

There has been a particular need for a compostable polymer composition for use in many end products such as polyvinyl chloride, polyvinyl acetate or olefin polymer films, banners, billboards, signs, laminates, ink jet media, diapers, hygienic pads and the like. These products must satisfy properties for practical purposes such as tear strength, tensile and impact strengths to function in many useful articles. However, the same properties that make them useful lead to their lack of biodegradability. PVC, PVAc and olefin polymers have achieved widespread usage. However, the explosive growth of such thermoplastics or elastomers has aggravated the problem of disposing of them, and has caused their accumulation in landfills. Very little of these polymeric waste products degrade in most landfills because of anaerobic conditions. The problem has become aggravated because of the shortage of landfills and municipalities are seeking to restrict the use of plastics because of their inability to degrade in landfills.

Environmental concerns with existing polymer stabilizers have stimulated interest in alternative stabilizers including organic based stabilizers. For example, in the pipe industry, PVC has long been stabilized with heavy metals, such as lead and cadmium. However, in Europe, replacement of lead-based stabilizers is currently one of the main focuses. As part of the voluntary initiative of Vinyl 2010, the European Vinyl Industry is committed to replace lead stabilizers in all PVC applications by 2015. Thus, there has been considerable interest in developing a new generation of environmentally acceptable heavy metal-free PVC stabilizers that prevent degradation and change in color during processing, and also provide tangible benefits to the manufacturer of useful articles.

In addition to providing useful PVC plastic articles which are free of heavy metal stabilizers, it would be highly desirable to also make them compostable. Thus, plastic articles that are capable of withstanding environmental conditions could be made and their degradation by sunlight, moisture, temperature, and the like prevented during their service life. Plastic products for practical purposes must satisfy such properties as water impermeability and sufficient mechanical properties, such as tear, tensile and impact strengths to function in useful articles. For example, there is a particular need for indoor or outdoor signs, billboards, banners, images, protective barriers, backdrops, and building wall coverings to provide plastic sheet material which will withstand outdoor environmental conditions. In the case of disposable health care products, diapers, underpants, hygienic pads, and the like, these products must also satisfy such properties as water impermeability in order to prevent seepage of urine or other human waste products therethrough. Further, for health care and waste management, there are needs for disposable plastic products such as medical tubing, bags and utensils that are biodegradable.

SUMMARY OF THE INVENTION

This invention is directed to heavy metal-free and anaerobically compostable vinyl halide polymeric compositions and articles, such as a composite polymeric sheet. The compostable articles are typically hydrophobic due to the vinyl halide polymers employed in their manufacture. In view of the hydrophobic nature of the polymers employed, the articles are well-suited for environmental use by withstanding conditions such as sunlight, moisture, humidity, and the like. They are therefore very adaptable for fabricating useful articles that can withstand environmental or use conditions. However, the polymeric compositions and articles are anaerobically compostable because they contain an organotitanate or an organozirconate as an anaerobic prodegradant, in relative amounts to render the polymer compostable in a landfill. In addition, the compositions contain a heavy metal-free organic based heat stabilizer that enables their fabrication into useful articles without degradation of vinyl halide polymer. Where polymer composites are made, the surface layer can be hydrophobic and the underlying layer can be a hydrolyzable biodegradable polymer which enables the entire article to be compostable in the landfill. Therefore, this invention satisfies environmental concerns involved in the fabrication, use, and disposal of vinyl halide polymer compositions.

More particularly, a suitable polymeric composition or article contains a vinyl halide polymer which may be a thermoplastic or elastomeric polymer. The term "vinyl halide" as used herein and understood in the art is intended to cover organic polymers consisting of long chains of carbon atoms and includes the addition of halogen atoms into the polymer chain of carbon atoms, such as polyvinyl chloride (PVC). Polymers are selected from the group consisting of a vinyl halide polymer, or copolymers or blends thereof. Composite articles of these polymers containing heavy metal-free stabilizers and anaerobic prodegradants with normally biodegradable polymer structures can be made according to this invention. In the case of the biodegradable thermoplastic polymer, suitable polymers include polylactic acid (PLA), polyvinyl alcohol polycaprolactone (PCL), polyamide, polyacrylamide, polyacrylate, polymethacrylate, polyester, and cellulose, and copolymers or blends thereof.

This invention is also directed to a method of anaerobic biodegradation of polymeric articles in a landfill. The method is practiced by introducing an article or a physically reduced form thereof into a landfill for anaerobic degradation. The article is comprised of an hydrophobic vinyl halide polymer containing an organic based heat stabilizer and an organotitanate or an organozirconate as a prodegradant in relative amounts to render the article anaerobically compostable. The organic based heat stabilizer is also contained in an amount to heat stabilize the vinyl halide polymer or copolymer during fabrication into a useful article. In the case of composite articles, for example, a polymeric surface layer contains the stabilizer and prodegradant, and underlying the hydrophobic surface layer can contain an hydrolyzable biodegradable thermoplastic polymer layer. Each layer is thus compostable or biodegradable in the landfill. Moreover, the heavy metal-free useful articles or composite articles having the hydrophobic vinyl halide polymer composition or surface layer enable environmental servicing utilities and, when introduced into a landfill, are anaerobically compostable.

DETAILED DESCRIPTION OF THE INVENTION

As reported in the above-identified Ser. No. 11/041,322 patent application, polyvinyl chloride compositions have been formulated with plasticizer and stabilizer along with the prodegradant composition. Polymeric sheets containing this composition and composites with woven or nonwoven sheets have been made compostable. Such compositions consist of (a) PVC; (b) a plasticizer selected from the group of completely aliphatic carboxylic acid esters; (c) a heat stabilizer selected from the group of sulfur-free dialkyl and monoalkyltin carboxylates; and (d) an anaerobically prodegradant reactive organotitanate or organozirconate. As reported in the above-identified Ser. No. 11/747,481 patent application, further unobvious and unexpected improvements have been made. In particular, compositions of vinyl halide resins such as PVC, even without plasticizer, are compostable when the prodegradant system is employed. In addition, it has also been found that the reactive organotitanate or organozirconate can be broadened to include other monomeric adducts in addition to the amide adduct disclosed in the above-identified Ser. No. 11/041,322 patent application. For instance, an ester adduct of the organotitanate or organozirconate and an organotin compound, in relative amounts, has been found to render the vinyl halide polymer composition compostable, even in the absence of a plasticizer. The above-identified applications Ser. Nos. 12/098,613, 12/049,668, and 12/500,805 are directed to further improvements in compositions, articles, and composites for other polymer systems, such as an olefin polymer and a vinyl acetate polymer.

This application is directed to further improvements in anaerobically compostable vinyl halide polymeric compositions and articles which anaerobically degrade in landfills. The compositions and articles are formulated with organic based heat stabilizers ("OBS stabilizers") which are free or essentially free of heavy metals such as lead, cadmium, or tin. Compostable polymer compositions or articles having very useful hydrophobic surfaces or layers comprise, for example, a vinyl halide (PVC) polymer and a monomeric adduct of an organotitanate, or organozirconate, as a prodegradant in relative amounts to render the polymer composition compostable. As employed herein, the term "adduct" is intended to mean a complex association of the monomeric molecule and the organotitanate or organozirconate molecule. It was previously reported that amide salts of the neoalkoxy modified monoalkoxy titanate or zirconate achieved the objectives of the invention. The amide salts were defined particularly by methacrylamide as the monomeric adduct of the reactive titanate or zirconate. It has also been found that the ester adducts of the specific organotitanates or zirconates can also function in the prodegradant of this invention. The monomeric ester of the organotitanate or organozirconate adduct is exemplified by dimethylaminoethyl methacrylate. It has also been found that the dimethylaminopropyl acrylamide is as effective as the methacrylamide.

The compositions and composites of this invention, as well as useful articles made therefrom, are compostable. "Compostable" means that the composition or sheet undergoes chemical, physical, thermal and/or biological degradation such that it may be incorporated into and is physically indistinguishable from finished compost (humus) and which ultimately mineralizes (biodegrades) to $CO_2$, water and biomass in the environment like other known compostable matter such as paper and yard waste. The compostable films and composites are anaerobically biodegradable. "Biodegradable" means that the composition or composite is susceptible to being assimilated by anaerobic microorganisms when buried in the ground, e.g., a landfill under conditions conducive to their growth. For purposes of this invention, "compostable" is intended to mean anaerobically biodegradable by microorganisms.

Anaerobic composting conditions that enable the chemical, physical, thermal and/or biological degradation of the composition or composite may vary. The compositions, articles or composites of this invention are especially adapted to be compostable in municipal solid waste composting facilities or landfills. For example, following ASTM D 5526-94 (reapproved 2002), Standard Test Method for Determining Anaerobic Biodegradation of Plastic Materials Under Accelerated Landfill Conditions, samples of PCV, PVAC and EPDM were degraded, incorporated into and physically indistinguishable in the test landfill.

Compostable polymer compositions, articles, and composites of this invention, their method of manufacture and compostability will be understood with reference to the following detailed description. The hydrophobic vinyl halide polymer in the article or article surface layer is broadly defined herein as a polymer which includes thermoplastic or elastomeric polymers. More preferably, it includes a vinyl halide polymer, copolymers and blends thereof as follows.

Vinyl Halide Polymer

The vinyl halide resin employed is most commonly a homopolymer of vinyl chloride, i.e., polyvinyl chloride. It is to be understood, however, that this invention is not limited to a particular vinyl halide resin such as polyvinyl chloride (PVC) or its copolymers. Other halogen-containing polymers or resins which are employed and which illustrate the principles of this invention include chlorinated polyethylene, chlorosulfonated polyethylene, chlorinated polyvinyl chloride, and other vinyl halide polymer or resin types. Vinyl halide polymer or resin, as understood herein, and as appreciated in the art, is a common term and is adopted to define those resins or polymers usually derived by polymerization or copolymerization of vinyl monomers including vinyl chloride with or without other comonomers such as ethylene, propylene, butene, hexene, octene, a diene, vinyl acetate, vinyl ethers, vinylidene chloride, methacrylate, acrylonitrile, acrylates, styrene, etc. A simple case is the conversion of vinyl chloride $H_2C=CHCl$ to polyvinyl chloride $(CH_2CHCl—)n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

Composites with Biodegradable Polymers

As stated above, composites of vinyl halide polymers and normally biodegradable polymers can be made according to of this invention. Such normally biodegradable polymers include polylactic acid (PLA), polyvinyl alcohol (PVA), polycaprolactone (PCL), polyamide, polyacrylamide, polyacrylate, polymethacrylate, polyester, and cellulose, and copolymers or blends thereof. Other examples of biodegradable polymers suitable for use are those which enable the manufacture of useful articles or composites such as sheet materials. These articles are formed in a number of ways such as by extrusion molding, coextrusion of a surface layer and underlying layer into a composite sheet, for example. The sheets may also be made by lamination of the layers, combined coextrusion-lamination techniques or coating techniques.

Anaerobic Prodegradant Organotitanate or Organozirconate

As disclosed in the above identified application Ser. No. 11/041,322, and more recently, the Ser. No. 12/500,805 application, the anaerobic prodegradant of this invention is an organozirconate or organotitanate. The monomeric adducts of the organozirconate or titanate are exemplified by the monomeric groups of dimethylaminopropyl acrylamide, methacrylamide, dimethylaminoethyl methacrylate, and other similar reactive monomeric groups as detailed herein. In a broader sense, the adducts more preferably comprise dialkylamino-short alkylchain-reactive monomers. The prodegradant may be defined more particularly as follows.

The chemical description and chemical structure of organotitanates or zirconates have been well developed. Kenrich Petrochemicals, Inc. is a manufacturer of these products and, hereinafter, the Kenrich products are interchangeably identified with the prefix "Kenrich", "K", "KR", and "LICA". For instance, Kenrich LICA 38J is a reactive titanate under the chemical name titanium IV neoalkanolato tri(dioctyl)pyrophosphate-O (adduct) N-substituted methacrylamide. Furthermore, with zirconium substituted for titanium, Kenrich produces NZ 38 under the chemical description zirconium IV neoalkanolato tri(dioctyl)pyrophosphate-O (adduct) N-substituted methacrylamide. These compounds are generally referred to as amide salts of neoalkoxy modified monoalkoxy titanate or zirconate. While the invention has been exemplified hereinafter with these amide adducts of these specific organotitanates or organozirconates and other prodegradants, it is to be understood that other similar compounds can achieve the objectives of this invention.

The K38J pyrophosphato titanium adduct is the reaction product of K38+ dimethylaminopropyl methacrylamide (DMPDMA), according to the following structure where R'=methyl, R"=propyl, R=butyl, n~3.

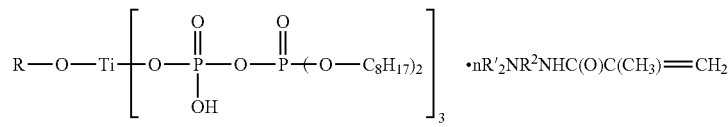

K38=the above structure without DMPDMA. K38 is titanium IV neoalkanolato tri(dioctyl)pyrophosphate-O. These two ingredients react rapidly at room temperature when mixed in stoichiometric proportions (close to 3:1). P—OH becomes P—O⁻ and R2N, R3N+. A bright red color develops, which is the thermochromic, indicating coordination of likely C=O to titanium, which displays such colors when pentacoordinate instead of tetra-coordinate. (For example, acetone.TiCl4 is orange-red, and the precursors, colorless.) Neither K38 nor DMPDMA cause depolymerization of olefin polymers when used alone. However, if added separately to the olefin polymer, the combination in situ is as effective as K38J. Thus, use of the term "adduct" is intended to cover the use of preformed complex or the separate addition of the components to enable their association or complexing in situ to provide the prodegradant effects of this invention.

A substituted methacrylamide can also be employed as an adduct of the organotitanate or zirconate. For instance, Kenrich Ken-React KR-238J is another reactive titanate where the monomeric adduct is a substituted methacrylamide. The KR-238J is a dimethylaminopropyl methacrylamide which has been found to be as effective as the methacrylamide adduct of Kenrich-38J, described above. A chemical description of KR-238J is titanium IV ethylenedialato bis(dioctyl) pyrophosphato ethylene titanate (adduct) N-substituted methacrylamide. Furthermore, dimethylaminoethyl methacrylate, a monomeric ester adduct, is equally effective in combination with the pyrophosphato form of the titanium or zirconium coupling agent. The K238J adduct has the chemical structure as follows:

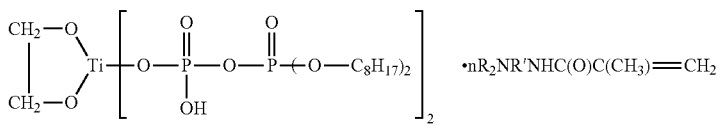

K238=the above structure without DMPDMA. Thus, as used herein "K38 and "K238" are intended to mean the organopyrophosphato titanate portion of the adduct which is complexed with the monomeric amide, ester, or other like monomers, and the resulting adduct is referred to herein as K38J and K238J, respectively. Specific compounds are exemplified by titanium IV neoalkanolato tri(dioctyl)pyrophosphato-O (adduct) N-substituted methacrylamide and zirconium IV neoalkanolato tri(dioctyl)pyrophosphato-O (adduct) N-substituted methacrylamide, titanium IV neoalkanolato bis(dioctyl)pyrophosphato-O (adduct) N,N-dimethylamino-alkyl propenoamide, and zirconium IV neoalkanolato bis(dioctyl) pyrophosphato-O (adduct) N,N-dimethylamino-alkyl propenoamide.

The above monomeric adducts result from salt or complex formation via the titanate/zirconate acidic —P═O(OH) group. The monomer contains a basic functional group that will react to form a salt (but not go on to other reactions such as oxidation). A tertiary amine group is favorable. This could be a dialkyl amine group, methyl pyridine functionality or a range of basic nitrogen heterocyclic groups. The rest of the reactive momomer must contain an activated carbon-carbon double bond. The C═C bond, to be activated, should be conjugated with C═O, as in an ester, ketone, aldehyde or amide, with —CN, with oxygen as in a vinyl ether, or with oxygen, nitrogen or sulfur in an allylic linkage, or with an aromatic ring as in styrene or vinyl ferrocene.

In a more generalized form as set forth the above identified applications Ser. Nos. 11/747,481 and 12/500,805, the adducts can be defined as:

Organotitanate or Zirconate —P═O(OH)-Salt Forming Group-R—C═C-Activating Group, where R is a hydrocarbon radical or substituted hydrocarbon radical and the activating group is conjugated with the C═C.

It has been found that a nitrate or sulfonate group, e.g. "X" may be substituted for the phosphate group and the results of this invention may be achieved. Thus the adducts may be defined as:

Organotitanate or Zirconate —X-Salt Forming Group-R—C═C-Activating Group where X is a phosphate, nitrate or sulfonate group, R is a hydrocarbon radical or substituted hydrocarbon radical and activating group has a C═O, —CN, oxygen, nitrogen, sulfur, or an aromatic ring conjugated with the C═C to activate the carbon-carbon double bond, wherein the substituent of the substituted hydrocarbon radical is selected from the group consisting of an ether, thioether, ester, thioester, and amide.

Other monomers of the adducts of this invention are exemplified by the following:

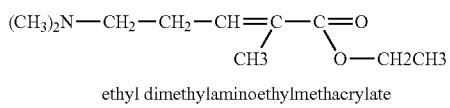

ethyl dimethylaminoethylmethacrylate

-continued

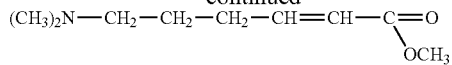

methyl dimethylaminopropyl acrylate

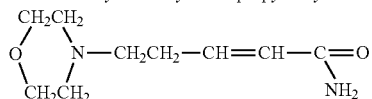

2-morpholine-N-ethyl acrylamide

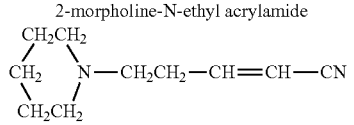

2-piperidinyl-N-ethyl acrylonitrile

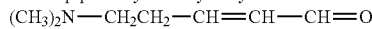

2-dimethylaminoethyl acrolein

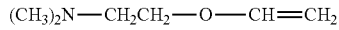

dimethylaminoethyl vinyl ether

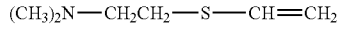

dimethylaminoethyl vinyl thioether

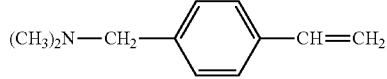

4-dimethylaminomethyl styrene

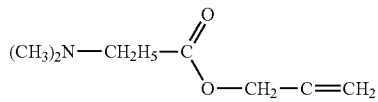

allyl 3-dimethylamino propionate

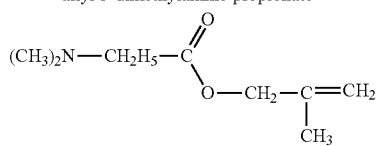

methallyl 3-dimethylamino propionate

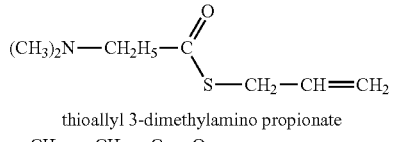

thioallyl 3-dimethylamino propionate

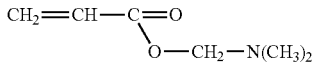

dimethylaminomethyl acrylate (reverse ester), also corresponding reverse amides

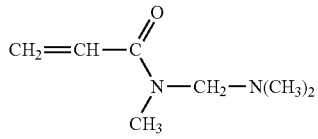

N-methyl-N-dimethylaminomethyl acrylamide

These organotitanates or zirconates are further described in considerable detail in the following U.S. Patents which are incorporated herein in their entireties by reference, namely, U.S. Pat. Nos. 4,069,192; 4,080,353; 4,087,402; 4,094,853; 4,096,110; 4,098,758; 4,122,062; 4,152,311; 4,192,792; 4,202,810; 4,261,913; 4,277,415; 4,338,220; 4,417,009; 4,512,928; 4,600,789; 4,623,738.

Also, products equivalent to Kenrich K38J and K238J are made by Nanjing Capatue Chemical Co., Ltd. of the Peoples' Republic of China, under the marks Ti Link TCA-L38J and TCA-K238A. Other information on these quat titanates and zirconates may be obtained with reference to Capatue Chemical publication of products entitled Organometallic Coupling Agents at www.Capatue.com and this information is incorporated herein by reference.

The above-identified patents have been granted to Monte et al., and assigned to Kenrich Petrochemicals, Inc. The patents are directed to coupling agents and conform to the following general formula:

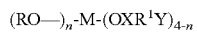

$$(RO-)_n-M-(OXR^1Y)_{4-n}$$

The M group in the above general formula is representative of titanium or zirconium. The coupling agents disclosed in the above-identified patents are generally referred to in the art as organotitanates or organozirconates. For example, the functions of the groups in the above general formula for the above titanates or zirconates have been described in the above patents and a paper entitled, "Neoalkoxy Titanate and Zirconate Coupling Agent Additives in Thermoplastics", Monte, S. J., Kenrich Petrochemicals, Inc., Polymers and Polymeric Composites (2002), 10 (II), 121-172. In addition, reference may be made to Handbook of Polymer Additives and Modifiers, Chapter 75: by Grossman, R. F., Coupling Agents; pp. 993-1000 (Van Nostrand 1992). The literature, as represented by these publications, has disclosed the merits of using organotitanates or organozirconates in polymer compositions to essentially increase the stability of the polymeric compositions, especially those compositions containing fillers or reinforcing agents, to provide an overall better balance of processing and properties in the manufacture of useful polymeric articles. However, in accordance with the principles of this invention, it has been found that useful hydrocarbon polymer compositions may be rendered anaerobically biodegradable in landfills by employing certain monomeric forms of organotitanates or zirconates as anaerobic prodegradants.

Accordingly, the following modified general formula is proposed to explain the anaerobic prodegradants functions as used according to the principles of this invention:

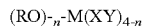

$$(RO)-_n-M(XY)_{4-n}$$

With an RO-M bond, M is a metal capable of forming a bond to an aliphatic carbon atom that has sufficient stability to permit addition to a polymeric composition and subsequent processing. In addition, the RO-M bond must not add toxicity and M is titanium or zirconium. The metal must also be able to expand its octet, that is, to form addition complexes with greater than tetrahedral coordination, and is involved in mediating carbon-carbon bond scission. The RO— group is designed to provide mobility in a polymer matrix.

In this invention, it has been found that groups, such as "X", can be placed on M that attract microbes, the latter being taken to designate bacteria, archaea, cyanobacteria, unicellular or cell cluster algae and fungi. These microbes require a hydrophilic site, such as provided by certain of the organotitanates and zirconates disclosed in the Kenrich references. The "Y" group provides the monomeric adduct which complexes or forms a salt with the X group of the organotitanate or zirconate as expressed in the more generalized formula above. The X groups found effective in attracting microbes include phosphate, nitrate and sulfonate. These ligands have provided other benefits, per the above Kenrich patents, but have never previously been shown to promote anaerobic landfill degradation. It is hypothesized that these oxygenated anions enable oxidation of hydrocarbon polymers by microbes anaerobically in landfills according to this invention. If the microbe-attracting group is designated ~, then the general formula is $(RO)_n\text{-}M(X\text{~}Y)_{4-n}$.

The microbe-attracting groups $X\text{~}$ may be ligands on M or functional groups on RO. The microbe-attracting ligand (~) itself, in some cases, may have specific affinity for the polymer. Whatever the mechanism or theory, monomeric adducts of organotitanates or zirconates have not been employed as anaerobic prodegradants in useful hydrophobic hydrocarbon polymer composition, articles and landfill degradation.

Organic Based Heat Stabilizer

As indicated in the Background of the Invention, environmental concerns with heavy metal stabilizers have stimulated interest in alternative stabilizers. It has been found, according to principles of this invention, that organic based heat stabilizers (herein sometimes simply "OBS") may be substituted for heavy metal based stabilizers or other metal based stabilizers, and the synergistic effects of heat stabilization to make useful articles and to provide for anaerobically compostable vinyl halide compositions may still be achieved.

A preferred OBS stabilizer that has been found environmentally acceptable while still enabling the fabrication benefits and anaerobic compostability in accordance with the principles of this invention, is a pyrimidinedione, having the following structure:

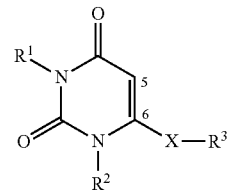

$XR^3$: electron—donating group
$R^{1-3}$: alkyl, phenyl, hydrogen

However, in accordance with the principles of this invention, other heavy metal-free organic based stabilizers are considered to be within the scope of this invention. Such OBS stabilizers include pyrimidinedione, dicyandiamide, urea, quanadine, tetrahydropyranyl esters or ethers, organic thiols, melamine, and hydrazides, for instance. These OBS stabilizers that have been referred to in the patent art such as U.S. Pat. Nos. 3,928,285; 4,948,827; 6,667,357; 6,762,231; 6,747,081; and 6,927,247. U.S. Pat. No. 3,660,331 describes tetrahydropyranylethers or esters that may be employed in heat stabilizing vinyl halide polymers. Belgian Patent No. 616,642, Netherlands 6,410,105, West German 1,140,705, British 986, 161 and U.S. Pat. Nos. 3,084,135; 3,194,786, and 2,367,483 are disclosures of organic based thermal stabilizers for vinyl halide polymers. Thus, the term "organic based thermal or heat stabilizer" and the components or compositions embraced thereby, which are essentially free of heavy metals, are known to those of skill in the art. However, this invention is predicated in part upon the employment of such a stabilizer in combination with the prodegradant which enables the anaerobic compostability of useful articles that have been fabricated employing vinyl halide resins and an OBS stabilizer.

Prodegradant Synergistic Composition

As earlier reported in application Ser. No. 11/747,481, it has been discovered that the prodegradant behavior of organotitanate or organozirconate adduct, i.e., the organopyrophosphato monomeric adduct, displays an unpredicted synergism in the compostability of vinyl halide polymers which are employed in an article or the composite article surface layer. Further improvements have been made as reported hereinafter for the prodegradants and polymers. The remarkable anaerobic compostability properties exist over ranges of ratios of the essential components. The exact mechanism for the unexpected results and the compostability of polymers with the prodegradants is not completely understood. Certainly there are theories which could be proposed, but regardless of theories, the beneficial results evident in the numerous examples of this invention which follow, in further view of this detailed description, speak for themselves. Applicant relies upon these empirical demonstrations of the principles of this invention to advance its merit.

With the prodegradant or OBS stabilizer of this invention, it has been found that the total composition of prodegradant or OBS stabilizer is useful over a range of about 1 to about 10 parts (phr) by weight based upon 100 parts by weight of the vinyl halide polymer. The most useful range is on the order of about 1 to about 5 phr.

The principles of this invention and its operating parameters will be further understood with reference to the following detailed examples which serve to illustrate the types of specific OBS stabilizers and prodegradants and their amounts as used in typical polymer formulations and the compostabilities displayed by the prodegradant of this invention. These examples are considered to be exemplary of this invention and should not be considered as limiting, especially in view of applicant's broad disclosure of the principles of this invention.

The compostability of the polymer compositions of the following Examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), at different percentages of distilled water (35% or 60%), and 10% fermenting inoculum from an active composter. Film samples of the compostable vinyl halide, vinyl acetate, and other polymers were run in the Examples which follow. All experiments were run at 97° F. in a dark incubator.

EXAMPLE 1

A plastisol was mixed comprising 100 parts PPG (Geon 121) in a dispersion resin, 80 parts of di-isononyl adipate (Exxon), 5 epoxidized soybean oil, 2 parts of an organic based heat stabilizer of pyrimidinedione having a structure which is exemplified above (Mark OBS 1200 developed by Crompton Vinyl Additives GmbH, Chemtura Company) and five parts of LICA 38J, identified above. The plastisol is coated as a 2 mil film on release paper using a wire wound bar. After ten days in an ASTM D 5526 landfill at 90-95° F., the film sample had been largely consumed, most having been replaced by bacterial colonies. In sixty days, the sample had vanished.

EXAMPLE 2

Example 1 was repeated, except that one part of LICA 38J was employed instead of five parts. After ten days in an ASTM D 5526 landfill at 90-95° F., the sample showed colonies forming at the surface and some edge erosion.

The above Examples 1 and 2 illustrate the use of the heavy metal-free organic based heat stabilizer in combination with the prodegradant to achieve the advantages of this invention. To illustrate the results with other heavy metal-free organic based heat stabilizers, other organic stabilizers may be employed. For example, the following comparative Examples are used to illustrate that a number of organic stabilizers may be substituted for the organotin stabilizers of Comparative Examples 3-46. Examples have been identified in the specification above, such as pyrimidinedione, dicyandiamide, urea, quanadine, tetrahydropyranyl esters or ethers, organic thiols, melamine, and hydrazides.

COMPARATIVE VINYL HALIDE POLYMER EXAMPLES 3-25

In each of the examples 3-14, as follows, standard resin formula was employed which contained 100 parts by weight polyvinyl chloride homopolymer (Geon 121 PVC by B.F. Goodrich). Included in the standard formula was a plasticizer such as di-octyl adipate (DOA) or di-isodecyl phthalate (DIDP). Examples 15-19 illustrate other polymer/copolymer blends and unplasticized compositions. Examples 20-25 illustrate the sulfonate and nitrate analogues of the phosphate ligand of the prodegradant.

The compostability of the PVC compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), 30% distilled water, and 10% fermenting inoculum from an active composter. 50 g were used in sealed Petri dishes with 2 by 1 inch samples of PVC composition or composite sheet material. All experiments were run at 97° F. in a dark incubator.

EXAMPLE 3

A plastisol was mixed with consisting of 100 parts PVC (Geon 121), 80 parts di-isodecyl phthalate (DIDP), and 2 parts dibutyltin dilaurate (DBTDL) heat stabilizer; coated as a 2 mil film on release paper and fused. Samples were unchanged after 90 days exposure to the test conditions of ASTM D 5526-94. The procedure was repeated using di-octyl adipate (DOA) in place of DIDP. After 90 days, there was visible mold growth on the film but no visible evidence of decomposition. The procedure was repeated with the addition of 2.5 parts of a 4% solution of isothiazolone biocide (MI-CRO-CHEK 11, Ferro Corporation). In this case, there was no evidence of mold growth after 90 days.

EXAMPLE 4

The plastisol of Example 3 was mixed using DOA, DBTDL plus 5 parts of titanium neoalkanato, tri(dioctyl) pyrophosphato-O-(adduct)-N-substituted methacrylamide (Kenrich LICA 38J). Fused samples were consumed in the test landfill within 10 days, vanishing to the visible eye. The experiment was repeated adding 2.5 parts of MICRO-CHEK 11 biocide, with identical results.

EXAMPLE 5

The plastisol of Example 3 was mixed with DBTDL, LICA 38J and, replacing DOA with the di-isononyl ester of cyclohexane dicarboxylic acid (DINCH, BASF). Upon testing per ASTM D 5526-94 method, fused samples disappeared in 7 days, with or without added biocide.

EXAMPLE 6

Example 5 was repeated with the zirconate analog of LICA 38J (Kenrich N Z 38J). Upon testing per ASTM D 5526-94 method, fused samples disappeared within 10 days.

EXAMPLE 7

The plastisol was mixed using DINCH, LICA 38J and dibutyltin maleate ester heat stabilizer (PLASTISTAB 2808, Halstab) in place of DBTDL. Upon testing per ASTM D 5526-94 method, fused samples disappeared within 10 days.

EXAMPLE 8

The plastisol was mixed using DINCH, LICA 38J, and 2 parts of a liquid calcium/zinc stabilizer (PLASTISTAB 3002, Halstab) in place of DBTDL organotin. After 90 days, the fused sample had heavy mold growth and had fragmented but was still visibly of the same dimensions.

EXAMPLE 9

Control samples were run for comparison. Upon testing per ASTM D 5526-94 method, samples of untreated filter paper showed mold growth within week and were consumed in 30 days. A sample of polylactic acid (PLA) 2 mil film was completely consumed in seven days. A sample of 1 mil low density polyethylene (LDPE) film was unchanged after 90 days.

EXAMPLE 10

A plastisol was mixed consisting of 100 parts Geon 121 PVC, 80 parts DOA, 2 parts DBTDL stabilizer and 5 parts of LICA 38, which is the titanate LICA 38J without the methacrylamide adduct. After 30 days at 971F per ASTM D 5526, there was no visible sign of decomposition. The same result was found with NZ 38, the zirconate bases for NZ 38J, and with 5 parts of methacrylamide itself. These tests establish that the methacrylamide adduct of the organotitanate or zirconate is necessary for compostability.

EXAMPLE 11

A plastisol was mixed consisting of 100 parts PVC, 80 parts DOA, 5 parts LICA 38J organotitanate-methacrylamide adduct, and 2 parts of dibutyltin di-isothioglycolate (SP1002, Ferro Corporation). After 30 days, there was only minor decomposition. This probably reflects the antioxidant capability of organotin mercaptides. It also presently establishes the preferred organotin carboxylates in the prodegradant system.

EXAMPLE 12

Example 11 was repeated using the following stabilization system: epoxidized soybean oil (ESO)—2 parts; phenyl di-iso-decyl phosphite—2 parts; zinc stearate—0.2 parts. After 30 days, there was no visible compostability, probably due to the antioxidant capability of the phosphite that would be used in most mixed metal stabilizer systems. In this case there was, however, notable mold growth, so it is possible that there might be eventual decomposition (period of years). Repetition using ESO containing 4% isothiazolone biocide led to no mold growth.

EXAMPLE 13

As described previously, plastisol was mixed consisting of 100 parts Geon 121 PVC, 80 parts DOA, 2 parts DBTDL, and 5 parts of Kenrich LICA 38J reactive titanate. To this was added 5 parts of VULCABOND MDX (Akzo Nobel) bonding agent. The plastisol was coated on polyester fabric and fused to a coating of about 5 mils thickness.

A sample of this coated fabric with the inventive prodegradant system and a control sample of a commercial finished product of the same construction (without the prodegradant system) were exposed at 90° F. per ASTM D5526 conditions,. After two weeks exposure, the control sample was essentially unchanged. The inventive sample has lost almost all trace of plastisol to the landfill, the only remnants being that which penetrated intersections of the fabric mesh. The fabric shows evidence of some decomposition and it is anticipated that the polyester will slowly decompose.

EXAMPLE 14

In Examples 3-13, the PVC samples were plasticized with DOA or DIDP in combination with a prodegradant system which was the adduct of K-38 and dimethylaminopropyl methacrylamide (DMPDMA). In order to demonstrate the effectiveness of the monomeric adduct in comparison to each of the adduct components, Examples similar to 3-13 were repeated with each of the adduct components alone. None of the components of the adduct, alone, caused depolymerization of the halogenated polymers. However, if each of the components of the adduct were added separately to the PVC compound, and reacted in situ, the combination was as effective as adding the adduct. Accordingly, it has been presently demonstrated that the monomeric adduct of the organotitanate or zirconate is essential in order to obtain the desired results of the prodegradant system.

EXAMPLE 15

1.5 grams of Poval (Kuraray) LM-20, a partially hydrolyzed polyvinyl acetate, having a number average molecular weight (Mn) of about 20,000 were dissolved in 50 grams of ethanol. The solution was coated on release liner to form a two-mil film when dry. Two grams of the dried film were placed in 50 grams of landfill composition per ASTM D 5526 containing 35% water; two grams were also placed in 50 grams of landfill composition having 60% water content. After ninety days at 35% moisture, the film was intact with a weight gain of about 6%. After ninety days at 60% moisture, the film appeared softened, and had gained about 10% in weight. There was no evidence of microbial growth. The cast film was clear and accepted pencil and ballpoint. It adhered strongly to 3M #142 pressure-sensitive tape

EXAMPLE 16

Example 13 was repeated with UCAR VYHH (Dow) PVC/VAC, which is a copolymer of polyvinyl chloride and vinyl acetate at 14% vinyl acetate, with a number average molecular weight (Mn) of about 10,000. Two films were cast from methylisobutylketone with two parts per hundred of dibutyltin dilaurate (DBTDL) heat stabilizer added. This Example demonstrates that when the vinyl copolymer of vinyl acetate with vinyl chloride is employed, stabilizer is added. The samples were translucent, accepted pencil and ballpoint ink, and had strong adhesion to 3M #142 tape. The samples showed no measurable weight loss after 90 days' exposure, either at a 35% or 60% moisture level, nor evidence of surface mold growth.

EXAMPLE 17

Example 16 was run with the addition of 2 phr of LICA 38J at 35% water, weight loss after 30 and 60 days was 65% and 96%, respectively. At 60% water, weight loss after 30, 60, and 90 days was 12%, 20%, and 27%, respectively. This Example demonstrated, at various moisture levels, landfill compostability of the composition. This Example 17 may be compared to Example 13 in the earlier application Ser. No. 11/747,481, filed May 11, 2007, for the purpose of demonstrating unplasticized PVC/VAC polymer compositions. The VYHH PVC copolymer with 14% vinyl acetate was employed in that Example 13. As reported in that Example 13, the VYHH PVC/VAC copolymer with vinyl acetate does not itself decompose into the landfill, nor does this occur with 2-5 phr of K-38, which is the titanate component of the adduct. However, samples containing the prodegradant system of 5,1, and 0.5 phr K38J adduct and 2 phr DBTL organotin depolymerization or compostability was observed upon performing the ASTMD 5526 conditions. Accordingly, when using the prodegradant system of K38J and organotin, after 60 days at 35° C. in the dark, no visual traces of the PVC/VAC copolymer were observed. These Examples 17 (in this application) and Example 13 of the patent application Ser. No. 11/747,481, demonstrate that unplasticized halogenated copolymers with vinyl acetate will effectively decompose with the prodegradant of this invention.

EXAMPLE 18

Example 17 was run using the 1:1 of UCAR VYHH PVC/VAC and Poval LM-20 PVAc, identified as above. At both moisture levels of 65% and 96%, the polymer had vanished into the landfill in 30 days. The 2 ml cast film was transparent, readily accepted pencil and ballpoint marking, and adhered strongly to 3M #142 tape. The sample exposed to UV-A radiation at 40° C. for 30 days (Q-panel) showed no discoloration. The sample, when ignited with a match, self-extinguished.

EXAMPLE 19

Example 18 was run using a blend of UCAR VYHH PVC/VAC and ELVAX-40, previously identified, at both 35 and 60 percent moisture levels, weight loss after 30 days was 45-50%, and 100% after sixty days. Accordingly, these Examples further illustrate the compostability of vinyl acetate copolymers according to the principles of this invention.

EXAMPLES 20-25

The purpose for these following Examples 20-35 is to demonstrate the effectiveness of sulfonate and nitrate analogs of the phosphate ligand in the above-identified prodegradant compounds. The hydrophobic hydrocarbon base polymer consisted of 100 parts PVC (Geon 121), 45 parts di-iso-nonyl adipate (DINA), 20 parts calcium carbonate, 6 parts titanium dioxide, 2.5 parts epoxidized soybean oil (ESO), and 2 parts of dimethyltin maleate. To the base PVC polymer composition was added 2 phr of LICA (KR) 38J and 2 phr of KR 238J, identified above, which served as Examples 20 and 21. Example 22 employed Kenrich 262J, which is the same compound as LICA 238J, but sidechains on the phosphorus are methyl and butyl instead of octyl. In other words, KR 262J is titanium IV bis(butyl, methyl)-pyrophosphato-O ethylenediolato (adduct) with DMAPMA. As used herein "DMAPMA" means N-substituted methacrylamide, above identified. Kenrich 262ESJ is the monomeric adduct of titanium IV bis(butyl, methyl)pyrophosphato-O ethylenediolato (adducts) bis(dioctyl)hydrogen phosphite and DMAPMA. For comparison with Examples 20-23, sulfate and nitrate analogs of the phosphate ligand of the prodegradants LICA 38J, 238J, and 262J were employed. In the case of Example 24, the sulfonate analog employed was titanium IV bis-2-propenolato-butanolato-tris-dodecylbenzenesulfonate (adduct) DMAPMA. In the case of Example 25, the nitrate analog was Kenrich 134J, which is the titanium IV bisphenylpropyl-phenolato-oxoethylenediolato (adducts) sorbitol nitrate and DMAPMA. The nitrate adduct was 1:1 DMAPMA adduct of the reaction product of 1:1 molar sorbitol nitrate and KR 134J. KR134J=titanium IV bis[4-(2 phenyl) 2-propyl-2]phenolato oxyethylenediolato.

All of the above PVC polymer compositions containing the prodegradant adducts having the phosphate, sulfate, and nitrate ligands were coated on release paper using a wire-bound bar infused at 150° C. to yield 2-3 mil coatings. 2 grams of each were placed on 50 grams of landfills medium per ASTM D5526. (21.5 grams sterilized sewage=milorganite, 7.5 grams of active compost, 21 grams of water, pH after 24 hours=7.8, $CO_2$ and $NH_3$ levels OK per the Solvita compost maturity spot test procedure). These were in crystal styrene petri dishes maintained at 35° C. in a dark incubator after being sealed. After 90 days, all of the above had vanished into the landfill except for a scatter of filter and pigment particles.

All of the above operating and comparative Examples describe the invention so that a person of skill in the art will be enabled to practice it.

Those of ordinary skill in the art realize that the descriptions, procedures, methods and compositions presented above can be revised or modified without deviating from the scope of the described embodiments, and such do not depart from the scope of the invention.

What is claimed is:

1. A heavy metal-free and anaerobically compostable vinyl halide polymer composition comprising
  a vinyl halide polymer or copolymer thereof,
  an organic based heat stabilizer essentially free of heavy metals in an effective amount to heat stabilize said polymer or copolymer, and
  a monomeric adduct of an organotitanate or an organozirconate as a prodegradant in relative amounts to render the polymer composition anaerobically compostable under ASTM D-5526-94 conditions, and wherein said adduct is defined by the formula

ORGANOTITANATE OR ZIRCONATE —X-SALT FORMING GROUP-R—C=C-ACTIVATING GROUP, where X is a phosphate, nitrate or sulfonate group, R is a hydrocarbon radical or substituted hydrocarbon radical and activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide.

2. The composition of claim 1 wherein said stabilizer is pyrimidinedione.

3. The composition of claim 1 wherein said stabilizer is selected from the group consisting of pyrimidinedione, dicyandiamide, urea, quanadine, tetrahydropyranyl esters or ethers, organic thiols, melamine, and hydrazides.

4. The composition of claim 1, wherein said polymer is selected from the group consisting of poly(vinylacetate-vinylchloride), and polyvinyl chloride, and copolymers or blends thereof.

5. The composition of claim 1 wherein the prodegradant and heat stabilizer are each contained in an amount of from about 1 to about 10 parts by weight based upon 100 parts by weight polymer.

6. The composition of claim 1 wherein the monomeric adduct is an amide adduct or an ester adduct.

7. The composition of claim 1 wherein said adduct is an organopyrophosphato adduct of a monomer selected from the group consisting of methacrylamide, N-substituted methacrylamide, methacrylate and N-substituted methacrylate.

8. The composition of claim 1 wherein said organotitanate or organozirconate is an amide or ester adduct of neoalkoxy modified monoalkoxy titanate or zirconate having a phosphate, nitrate, or sulfonate group.

9. The composition of claim 1 wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium. IV neoalkanolato tri(dioctyl)-pyrophosphato-O (adduct) N-substituted methacrylamide, zirconium IV neoalkanolato bis(dioctyl) pyrophosphato-O (adduct), N,N-dimethylamino-alkyl propenamide, titanium IV bisphenylpropyl-phenolato-oxoethylenediolato (adducts) bis(dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide, titanium IV 2-propenolato tris(dioctyl) pyrophosphato-O (adduct) dimethylaminopropyl styrene, titanium IV bis-2-propenolato-butanolato-tris-dodecylbenzesulfonate (adduct) N-substituted methacrylamide.

10. The composition of claim 1 wherein the vinyl halide polymer or copolymer thereof is derived from a vinyl chloride monomer with or without a comonomer selected from the group consisting of ethylene, propylene, butene, hexene, octene, a diene, styrene, vinyl acetate, vinyl ether, vinylidene chloride, acrylate, methacrylate, and acrylonitrile.

11. The composition of claim 1 wherein X is phosphate.

12. The composition of claim 2 or 3 wherein the monomeric adduct is selected from the group consisting of titanium IV neoalkanolate tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolate tri(dioctyl) pyrophosphato-O (adduct) N-substituted methacrylamide, zirconium IV neoalkolato bis(dioctyl) pyrophosphato-O (adduct) N,N-dimethylamino-alkyl propenamide, titanium IV bisphenylpropyl-phenolato-oxoethylenediolato (adducts) his (dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide, titanium IV 2-propenolato tris(dioctyl) pyrophosphato-O (adduct) dimethylaminopropyl styrene, titanium IV bis-2-propenolato-butanolato-tris-dodecylbenzesulfonate (adduct) N-substituted methacrylamide.

13. An article formed from the composition of claim 1.

14. The article of claim 13 having a compostable woven or nonwoven fabric layer bonded to said composition.

15. The article of claim 14 wherein said woven or nonwoven fabric is a compostable fabric of a polymer selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

16. The article of claim 13 wherein said polymer is selected from the group consisting of poly(vinylacetate-vinylchloride), and polyvinyl chloride, and copolymers or blends thereof.

17. The article of claim 13 or 14 in the form of a sheet for use in indoor or outdoor signs, billboards, banners, images, protective barriers, backdrops, and wall coverings.

18. The article of claim 13 wherein the monomeric adduct is an adduct of a monomer selected from the group consisting of ethyl dim ethylaminoethylmethacrylate,
methyl dimethlaminopropyl acrylate,
2-morpholine-N-ethyl acrylamide,
2-piperidinyl-N-ethyl acrylonitrile,
2-dimethylaminoethyl acrolein,
dimethylaminoethyl vinyl ether,
dimethylaminoethyl vinyl thioether,
4-dimethylaminomethyl styrene,
allyl 3-dimethylamino propionate,
methallyl 3-dimethylamino propionate,
thioallyl 3-dimethylamino propionate,
dimethylaminomethyl acrylate, and
dimethylaminomethylacrylamide.

19. A heavy metal-free and anaerobically compostable polymeric composite article comprising
an article having an hydrophobic vinyl halide polymer or copolymer surface layer, and
biodegradable polymer layer underlying said surface layer said surface layer containing (a) an organic based heat stabilizer essentially free of heavy metals in an effective amount to heat stabilize said polymer or copolymer and (b) a monomeric adduct of an organotitanate or an organozirconate as a prodegradant in relative amounts to render the surface layer anaerobically compostable under ASTM D-5526-94 conditions, thereby enhancing degradation of said article, and wherein said adduct is defined by the formula

ORGANOTITANATE OR ZIRCONATE —X-SALT FORMING GROUP-R—C=C=ACTIVATING GROUP where X is a phosphate, nitrate or sulfonate group, where R is a hydrocarbon radical or substituted hydrocarbon radical and activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide.

20. The article of claim 19 wherein said stabilizer is selected from the group consisting of pyrimidinedione, dicyandiamide, urea, quanadine, tetrahydropyran esters or ethers, organic thiols, melamine, and hydrazides.

21. The article of claim 19 wherein said biodegradable polymer is selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

22. The article of claim 19 wherein the prodegradant or stabilizer is contained in an amount from about 1 to about 10 parts by weight based 100 parts by weight polymer.

23. The article of claim 19 wherein the monomeric adduct is an amide adduct or an ester adduct.

24. The article of claim 19 wherein said adduct is an organopyrophosphato adduct of a monomer selected from the group consisting of methacrylamide, N-substituted methacrylamide, methacrylate and N-substituted methacrylate.

25. The article of claim 19 wherein said organotitanate or organozirconate is an amide or ester adduct of neoalkoxy modified monoalkoxy titanate or zirconate having a phosphate, nitrate, or sulfonate group.

26. The article of claim 19 wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolato tri(dioctyl) pyrophosphato-O (adduct) N-substituted methacrylamide, zirconium IV neoalkanolato bis(dioctyl) pyrophosphato-O (adduct) N,N-dimethylamino-alkyl propenamide, titanium IV bisphenylpropyl-penolato-oxoethylenediolato (adducts) bis(dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide, titanium IV 2-propenolato tris(dioctyl) pyrophosphato-O (adduct) dimethylaminopropyl styrene, titanium IV bis-2-propenolato-butanolato-tris-dodecylbenzesulfonate (adduct) N-substituted methacrylamide.

27. The composition of claim 1 wherein the vinyl halide polymer or copolymer thereof is derived from a vinyl chloride monomer with or without a comonomer selected from the group consisting of ethylene, propylene, butene, hexene, octene, a diene, styrene, vinyl acetate, vinyl ether, vinylidene chloride, acrylate, methacrylate, and acrylonitrile.

28. The article of claim 19 wherein X is a phosphate.

29. The article of claim 19 in the form of a sheet, having bonded thereto a compostable woven or nonwoven fabric layer.

30. The article of claim 29 wherein said woven or nonwoven fabric is a compostable fabric of a polymer selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

31. The article of claim 30 wherein said article polymer surface layer contains a polymer selected from the group consisting of poly(vinylacetate-vinylchloride), and polyvinyl chloride, and copolymers or blends thereof.

32. The article of claim 25, 26, or 29 in the form of a sheet for use in indoor or outdoor signs, billboards, banners, images, protective barriers, backdrops, and wall coverings.

33. A method of anaerobic biodegradation of a compostable polymeric article having a surface layer of an hydrophobic vinyl halide polymer or copolymer containing
(a) an organic based heat stabilizer in effective amount to heat stabilize said polymer or copolymer and
(b) a monomeric adduct of an organotitanate or an organozirconate as a prodegradant in relative amounts to render the surface layer anaerobically compostable under ASTM D-5526-94 conditions, and wherein said adduct is defined by the formula

ORGANOTITANATE OR ZIRCONATE —X-SALT FORMING GROUP-R—C═C-ACTIVATING GROUP where X is a nitrate or sulfonate group, R is a hydrocarbon radical or substituted hydrocarbon radical and activating group has a C═O, —CN, oxygen, nitrogen, sulfur, or an aromatic ring conjugated with the C═C to activate the carbon-carbon double bond, wherein the substituent of the substituted hydrocarbon radical is selected from the group consisting of an ether, thioether, ester, thioester, and amide, anaerobically degrading said article surface layer in the landfill, thereby enhancing degradation of said article.

34. The composition of claim 33 wherein said stabilizer is selected from the group consisting of pyrimidinedione, dicyandiamide, urea, quanadine, tetrahydropyran esters or ethers, organic thiols, melamine, and hydrazides.

35. The method of claim 33 wherein said article has a biodegradable polymer layer underlying said surface layer, wherein said biodegradable polymer is selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

36. The method of claim 33 wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolato tri(dioctyl) pyrophosphato-O (adduct) N-substituted methacrylamide, zirconium IV neoalkanolato bis(dioctyl) pyrophosphato-O (adduct) N,N-dimethylamino-alkyl propenamide, titanium IV bisphenylpropyl-phenolato-oxoethylenediolato (adducts) bis(dioctyl) hydrogen phosphite and N-substituted methacrylamide, titanium IV bis (butyl methyl)-pyrophosphato-ethylenediolato (adducts) bis(dioctyl) hydrogen phosphite and N-substituted methacrylamide, titanium IV his (butyl methyl)-pyrophosphato-ethylenediolato (adduct) bis(dioctyl) hydrogen phosphite and N-substituted methacrylamide, titanium IV 2-propenolato tris(dioctyl) pyrophosphato-O (adduct) dimethylaminopropyl styrene, titanium IV bis-2-propenolato-butanolato-tris-dodecylbenzesulfonate (adduct) N-substituted methacrylamide.

37. The method of claim 33 wherein the hydrophobic vinyl halide polymer or copolymer of the surface layer is derived from a vinyl chloride monomer with or without a comonomer selected from the group consisting of ethylene, propylene, butene, hexene, octene, a diene, styrene, vinyl acetate, vinyl ether, vinylidene chloride, acrylate, methacrylate, and acrylonitrile.

38. The method of claim 32 wherein the adduct is an organopyrophosphato adduct of a monomer selected from the group consisting of methacrylamide, N-substituted methacrylamide, methacrylate and N-substituted methacrylate.

* * * * *